INVENTORS.
JÜRGEN EHL
RUDOLF HÖRNIG

United States Patent Office
3,411,380
Patented Nov. 19, 1968

3,411,380
MEANS FOR INCREASING THE ENDURANCE LIMIT OF HIGHLY STRESSED STRUCTURAL PARTS, ESPECIALLY OF CRANK SHAFTS FOR MOTOR VEHICLES
Jurgen Ehl, Stuttgart-Bad Cannstatt, and Rudolf Hornig, Hofingen, Wurttemberg, Germany, assignors to Daimler-Benz Aktiengesellschaft, Stuttgart, Germany
Filed July 22, 1966, Ser. No. 567,204
Claims priority, application Germany, July 24, 1965, D 47,826
13 Claims. (Cl. 74—595)

ABSTRACT OF THE DISCLOSURE

A crankshaft with a surface-hardened pin portion, where the hardened zone boundary is concavely arcuate with respect to the adjacent pin surface and terminates on each side tangentially with the rounded-off fillet that smoothly joins the pin and adjacent web, and the method of producing the same. The intersection of the boundary and fillet being at an angle of 15° as measured from the center of curvature with respect to the perpendicular passing through the axis of the pin.

Background of the invention

One can learn from the prior publications and deliberations, known to date, that at hardened transitions the endurance limit or fatigue strength is strongly reduced on the surface of structural parts by reason of different unfavorable influences such as, for example, the notch effect of the hardened transitional zones, annealing as well as in particular by unfavorable inherent or residual tensional stresses. The last-mentioned statement, namely that within the hardened transitional zones a transition from an inherent or residual pressure stress favorable as regards endurance limit to an unfavorable inherent or residual tensional stress takes place also at the surface is based, however, exclusively on measurements with continuous surface-hardened cylinders whereby high inherent or residual pressure stresses were determined within the zones near the surface which decreased strongly in the inward direction and passed over into inherent or residual tensional stresses approximately at the depth of the hardened transition. This stress or strain pattern found with depth measurements in the hardened transitional zone was heretofore transferred in an analogous manner to a hardened transitional zone along the surface of the specimen or test piece.

If such a hardened end zone falls within the proximity of a transitional rounded-off portion or shoulder—as, for example, in crank shafts—then an unfavorable superimposition of the notch stresses is added to the transitional rounded-off portion or shoulder. In order to avoid this unfavorable superimposition, it has been recommended heretofore to permit the hardened zone to run out or end at some distance from the rounded off portion or shoulder or to harden completely also the rounded-off portion or shoulder.

It is already known to completely harden the transitional rounded-off portions or shoulders of the end pins of crankshafts, and one has achieved therewith a considerable increase in the endurance limit within this crankshaft area. In contradistinction thereto, the transitional rounded off portions or shoulders within the remaining crankshaft parts should not be hardened because the crankshaft still has to be trued after the hardening operation and therefore the texture or grain within the transitional rounded off portions or shoulders is to retain a certain yieldingness and ductility in order to prevent cracks thereat during the truing operation. For example, with triangular bending moment loading, the largest deformation has to be absorbed by the transitional rounded-off portions or shoulders of the center crankshaft area. The center crankshaft pins, therefore, were hardened up to now according to the considerations indicated above whereby the adjoining transitional rounded-off portions or shoulders remained without increase in the endurance limit as the hardened zone ran out as far as possible from the rounded-off portion or shoulder.

Summary of the invention

The present invention is concerned with the aim to considerably increase the endurance limit or fatigue strength at the transitional rounded-off portions or shoulders of the structural parts in question, in particular, of crankshafts while at the same time maintaining the trueability thereof. As solution to the underlying problem, the present invention proposes such a surface hardening of the structural parts that the hardened places have in longitudinal cross section a hardened zone essentially defined and limited by a shell- or dish-like shape, whereby the hardened depth decreases in the direction toward the rounded-off shoulder or shoulders and whereby the boundary of the hardened zone passes over into the rounded-off shoulders.

On the one hand, the trueability of the crankshafts remains preserved by the hardening thereof in accordance with the present invention. Furthermore, measurements at specimens or test pieces, which were surface-hardened in such a manner, have resulted in considerable increases of the endurance limit or fatigue strength so that the aforementioned inventive concept has to be considered as overcoming a prejudice of the technical world essentially determined by the aforementioned analogy considerations.

The transitional place of the hardened zone into the transitional radius can be, as such, chosen at will. However, the present invention proposes as an optimum in that connection that the boundary of the hardened zone contacts the rounded-off portion or shoulder at a place which is at an angle of about 15° to the perpendicular, extending through the center point of the radius of curvature of the rounded-off shoulder, on the place to be hardened. The transition of the hardened zone into the transitional rounded-off portion or shoulder may also take place, in principle, in any desired manner. However, the present invention recommends as continuous as possible a transition whereby it preferably provides that the boundary of the hardened zone passes over tangentially into the rounded-off portion or shoulder. By the use of such a transition without any bend, notch effects in the hardened transitional zone are far-reachingly avoided in an advantageous manner.

The surface hardening can take place, in principle in any desired manner. In the event the surface hardening is carried out according to the flame- or induction-hardening process, the present invention preferably provides that the surface-hardening takes place in a manner, known per se, by rotating—standstill hardening. The process of the rotation—standstill hardening—whereby the workpiece surface is heated at once to the hardening temperature over the length to be hardened and is subsequently quenched and whereby the specimen is rotated about its axis during the heating—is particularly well suited for the dish- or shell-shaped construction of the hardened zone according to the present invention. Thus, for example, with the application of the induction hardening process, the induction coil can be constructed in such a manner that the density of the lines of flux gradually runs out at the ends of the coil.

Correspondingly, a gradual running out of the hardened zone will occur at these places.

Accordingly, it is an object of the present invention to provide a method for increasing by simple means the endurance limit and fatigue strength of highly stressed structural parts and the novel structural parts, obtained from such method while avoiding the aforementioned shortcomings and drawbacks encountered with the prior art methods and constructions.

A further object of the present invention resides in a method for hardening rounded-off transitional places in structural parts, particularly in crankshafts of motor vehicles, in which an unfavorable superimposition of additional undesirable stresses over the existing and inherent unfavorable stress distribution is prevented in an effective manner.

A further object of the present invention resides in a method for hardening rounded-off structural parts which considerably increases the endurance limit thereof while still permitting the subsequent truing of certain portions thereof.

Still another object of the present invention resides in a structural part, particularly a crankshaft for motor vehicles in which the fatigue strength is considerably increased in the stressed shoulders thereof compared to the prior art constructions.

These and further objects, features, and advantages of the present invention will become more obvious from the following description when taken in connection with the accompanying drawing which shows, for purposes of illustration only, one embodiment in accordance with the present invention.

*Detailed description of the drawing*

Figure 1:
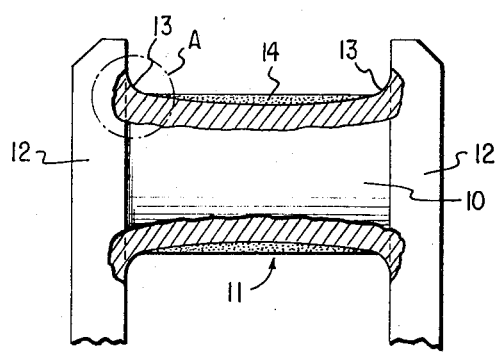
FIGURE 1 is a partial elevational view of a crankshaft in accordance with the present invention, with parts thereof shown in cross section.

Referring now to the drawing wherein like reference numerals are used throughout the two views, to designated like parts, and more particularly to FIGURE 1, the crank pin 10 of a crankshaft generally designated by reference numeral 11 passes over on both sides thereof into crank webs or cheeks 12 whereby a rounded off portion or shoulder 13 is provided at each transition. The crank pin 10 is provided with a hardened zone 14 of shell- or dish-like shape as viewed in longitudinal cross section whose boundary 15 passes over into the rounded off portion or shoulder 13.

Figure 2:
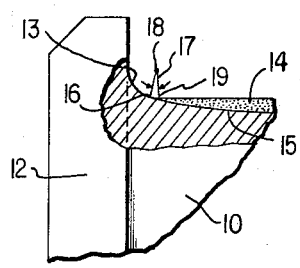
FIGURE 2 is an enlarged partial view, partly in cross section, on a greatly enlarged scale and illustrating the area indicated by the circle A of FIGURE 1.

As may be seen more clearly from FIGURE 2, the transition of the hardened zone 14 into the transitional rounded off portion or shoulder 13 takes place tangentially whereby the respective place of contact 16 of the hardened zone 14 and of the transitional rounded off portion 13 is disposed at an angle 17 of about 15° with respect to the perpendicular 19 on the hardened surface and passing through the center point 18 of the radius of curvature of the rounded off portion 13.

We claim:

1. A method for increasing the endurance limit of highly loaded structural parts such as, for example shafts which are provided with offsets and rounded-off portions between the same and which are surface hardened between such rounded-off portions and are trued after the hardening operation, the improvement comprising surface-hardening the shaft to form a hardened zone with an arcuate boundary, the depth of the hardened zone decreasing in the direction toward a corresponding rounded-off portion, and the boundary of the hardened zone passing over into the rounded-off portion around the entire periphery of the shaft.

2. A method according to claim 1, wherein the boundary of the hardened zone contacts the rounded-off portion approximately at a place which is at an angle of about 15° to the perpendicular to the shaft and extending through the center point of the radius of curvature of the rounded-off portion.

3. A method according to claim 2, wherein the boundary of the hardened zone passes over substantially tangentially into the rounded-off portion.

4. A method according to claim 1, wherein the boundary of the hardened zone passes over substantially tangentially into the rounded-off portion.

5. A structural part having a substantially straight surface portion, at least one offset surface portion and at least one rounded-off surface portion smoothly joining said straight surface portion with said offset surface portion, wherein the improvement comprises: a surface-hardened zone including said straight surface portion with an arcuate transition boundary concave with respect to said straight surface portion as seen in longitudinal cross section, the depth of the hardened zone decreasing in the direction toward the rounded-off portion, and the boundary of the hardened zone passing over into the rounded-off portion.

6. A structural part according to claim 5, wherein the boundary of the hardened zone contacts the rounded off portion at a place where the radius of curvature forms an angle of about 15° with the perpendicular to the surface of the straight portion and passing through the center point of the radius of curvature of the rounded off portion.

7. A structural part according to claim 6, wherein the boundary of the hardened zone passes over substantially tangentially into the rounded off portion.

8. A structural part according to claim 5, wherein the boundary of the hardened zone passes over substantially tangentially into the rounded off portion.

9. A structural part according to claim 5, wherein the straight portion is adjoined on both sides thereof by offsets by way of rounded off portions, and wherein the hardened zone is defined by a substantially dish-shaped configuration as seen in longitudinal cross section.

10. A crankshaft having a crank pin, a crank web at each end of the crank pin and a rounded off shoulder connecting the crank pin with a respective crank web, wherein the improvement comprises the crank pin of the structural part is surface hardened intermediate said shoulders, the hardened zone being defined by a substantially dish-shaped configuration as seen in longitudinal cross section, the depth of the hardened zone decreasing in the direction toward a respective rounded-off shoulder and the boundary of the hardened zone passing over into the rounded-off shoulder around the entire periphery of the crank pin.

11. A crankshaft according to claim 10, wherein the boundary of the hardened zone contacts the rounded-off shoulder at a place where the radius of curvature of the shoulder subtends an angle of about 15° with the perpendicular to the axis of the crank pin which passes also through the center point of the radius of curvature of the rounded-off shoulder.

12. A crankshaft according to claim 11, wherein the boundary of the hardened zone passes over substantially tangentially into the rounded-off shoulder.

13. A crankshaft according to claim 10, wherein the boundary of the hardened zone passes over substantially tangentially into the rounded-off shoulder.

References Cited

UNITED STATES PATENTS

| | | | |
|---|---|---|---|
| 2,170,130 | 8/1939 | Denneen et al. | 148—146 X |
| 2,213,241 | 9/1940 | Denneen et al. | 148—150 X |
| 2,800,809 | 7/1957 | Pike | 74—595 |
| 3,108,913 | 10/1963 | Sommer | 74—595 X |
| 3,257,865 | 6/1966 | Seulen et al. | 74—595 |

FOREIGN PATENTS 799,046  12/1935  France.

MILTON KAUFMAN, *Primary Examiner.*